United States Patent [19]
Mason

[11] Patent Number: 5,856,038
[45] Date of Patent: Jan. 5, 1999

[54] RETENTION LATCH

[75] Inventor: Neil Mason, Chilton, United Kingdom

[73] Assignee: Black & Decker Inc., Newark, Del.

[21] Appl. No.: 693,771

[22] Filed: Aug. 7, 1996

[30] Foreign Application Priority Data

Aug. 12, 1995 [GB] United Kingdom ............... 9516583

[51] Int. Cl.[6] .................................................. H01M 2/10
[52] U.S. Cl. ........................... 429/97; 429/96; 429/100
[58] Field of Search ............................ 429/96, 97, 98, 429/99, 100

[56] References Cited

U.S. PATENT DOCUMENTS

| | | | |
|---|---|---|---|
| 3,998,516 | 12/1976 | Mabuchi | 429/100 |
| 3,999,110 | 12/1976 | Ramstrom et al. | 429/98 |
| 4,020,245 | 4/1977 | Mabuchi et al. | 429/100 |
| 4,371,594 | 2/1983 | Ohara et al. | 429/97 |
| 4,871,629 | 10/1989 | Bunyea | 429/97 |
| 4,880,712 | 11/1989 | Gordecki | 429/97 |
| 5,225,293 | 7/1993 | Mitchell et al. | 429/97 |
| 5,586,907 | 12/1996 | Frantz et al. | 429/96 |
| 5,589,288 | 12/1996 | Coulson et al. | 429/96 |

FOREIGN PATENT DOCUMENTS

| | | |
|---|---|---|
| 0 398 607 A1 | 11/1990 | European Pat. Off. . |
| 0398607 | 11/1990 | European Pat. Off. . |
| 0 528 478 A1 | 2/1993 | European Pat. Off. . |
| 0528478 | 2/1993 | European Pat. Off. . |
| 2215386 | 9/1989 | United Kingdom . |
| 2224537 | 5/1990 | United Kingdom . |
| 2254647 | 4/1992 | United Kingdom . |
| 2254647 | 10/1992 | United Kingdom . |
| 2285657 | 7/1995 | United Kingdom . |

Primary Examiner—Stephen Kalafut
Assistant Examiner—Carol Chaney
Attorney, Agent, or Firm—Bruce S. Shapiro; Dennis A. Dearing; John D. Del Ponti

[57] ABSTRACT

A retention latch (2) for a device (28) comprises a biasing spring (4) arranged to force arm members (2) into engagement with a battery (14) thereby to prevent the battery being removed from the device (28). The user moves the retention latch via detent member (8) against the force of the spring (4) thereby to move the arms to disengage with the battery such that the battery may be removed from the device.

6 Claims, 2 Drawing Sheets

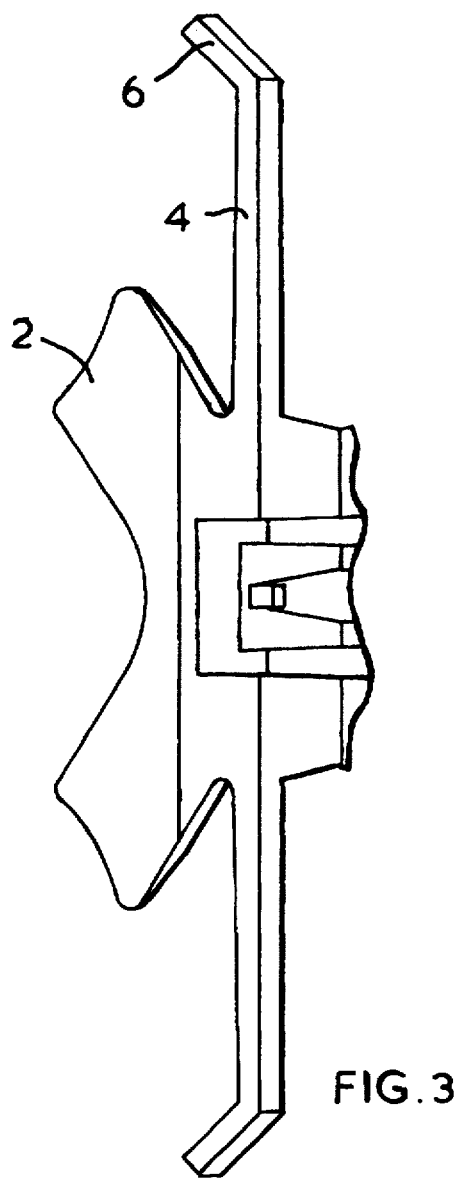
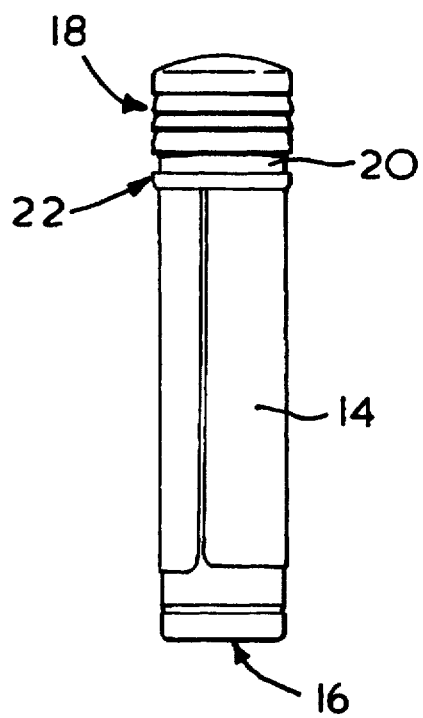
FIG. 3
FIG. 4
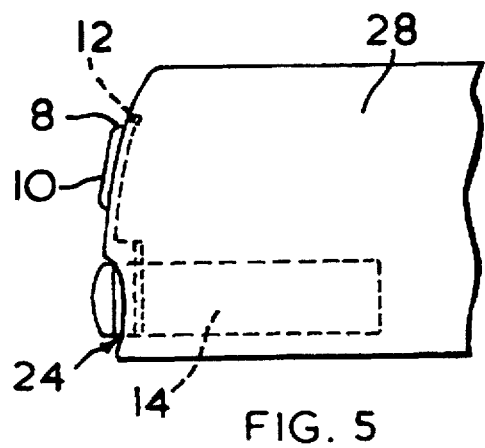
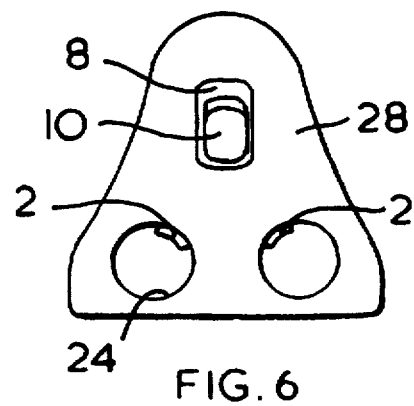
FIG. 5
FIG. 6

RETENTION LATCH

The invention relates to cordless (i.e. battery operated) devices such as portable electronic devices, toys, power tools or kitchen appliances. More particularly, the present invention relates to a battery pack retention latch to retain the pack in the device.

For the consumer market, most cordless devices have a battery pack made integrally in the device housing because of reduced cost, increased user convenience and sturdiness. However, there is also a desire to provide consumer devices with detachable packs, simplifying the recycling of the packs, and enabling the provision of a family of cordless devices using an interchangeable pack and a single charger. Also, it is desirable to retain the battery pack in the device such that the battery pack may be easily coupled with the device and readily removable from the device. Of course, these design goals are not unique to consumer devices, but are equally desirable for professional cordless devices in which detachable packs have been standard for many years.

Accordingly, it is an object of the present invention to provide an improved battery pack retention latch to retain the pack in a cordless device embodying the foregoing design objectives.

According to the present invention therefore there is provided a retention latch adapted to be positioned within a device for retaining a battery or the like in the device, the retention latch comprising: at least one arm member arranged for releasable engagement with said battery; spring means arranged for resiliently biasing the at least one arm member into engagement with said battery; and a manually operable detent means arranged for movement in a first direction against the force of the spring means thereby to release said battery from the at least one arm member, and for movement in a second direction under the force of the spring means into a rest position wherein said battery may be engaged by the at least one arm member. Preferably the at least one arm member has a distal end shaped to compliment the peripheral shape of said battery each to engage one of a pair of said batteries. Advantageously the retention latch has a pair of arm members. Additionally or alternatively the spring member may comprise a leaf spring, the leaf spring may itself comprise two extensions, one on either side of the at least one arm member. The manually operable detent means may carry a recess with which a digit of a user may co-operate.

The present invention will now be explained, by way of example only, with reference to the following drawings of which:

FIG. 3 shows an underside schematic view of the retention latch;

FIG. 4 shows a side view of a battery in accordance with the present invention;

FIG. 5 shows a partially sectioned side view of the retention latch, battery and the device in which they are incorporated; and FIG. 6 shows a rear view of the device of FIG. 5.

Figure 1:
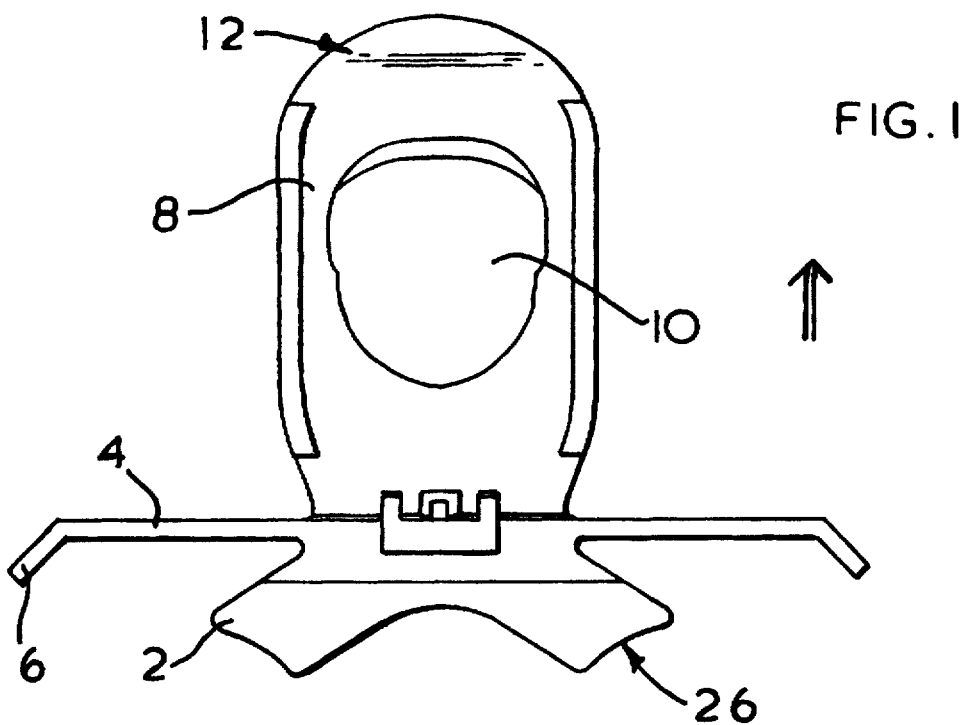
FIG. 1 shows a schematic rear view of a retention latch in accordance with the present invention.

Referring firstly to FIG. 1, it will be seen that the retention latch in accordance with the present invention comprises two arm members 2 in this example formed from a plastics material and having an elongate section terminating in a distal end which is shaped to compliment the peripheral shape of a battery with which it engages, as will be explained herebelow. The latch has a spring member 4, here a leaf spring in the form of a long flexible arm terminating in an angled lip 6 for attachment in a portion of a device 28 in which the latch is mounted. The retention latch also has a manually operable detent means 8 coupled to both the spring means 4 and the at least one arm member 2.

It is preferable that the entire retention latch (comprising the arm member 2, spring means 4 and detent means 8) be formed integrally from a single plastics moulding. This is not imperative to the present invention but, as will be appreciated reduces manufacturing costs. The arm member 2 and spring means 4 are co-planar looking into the plane of the drawing, but the detent means 8 is spaced therefrom as can be seen more readily from FIG. 2.

Figure 2:
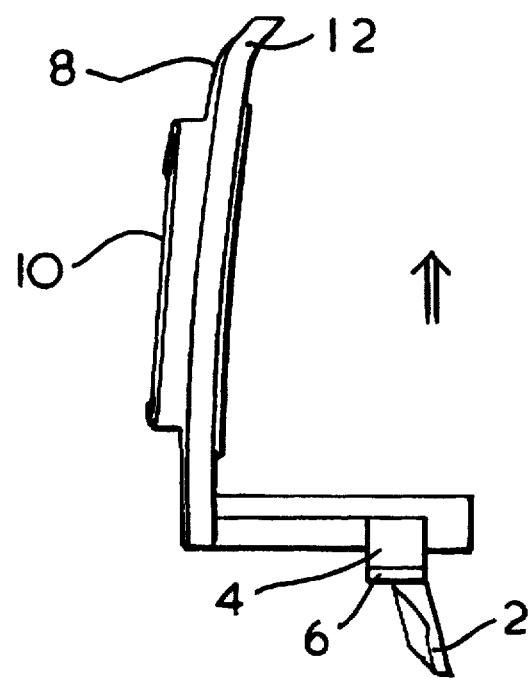
FIG. 2 shows a side view.

The detent means 8 carries a recess 10 with which a digit or finger of a user may co-operate. Considering now FIGS. 1, 2 and 3, the operation of the retention latch will be explained. The spring means 4 is held within the device and supported by each of the lips 6 at the end thereof. The distal end of the detent means 8 is shaped to be slightly curved (12) and this is supported against movement to the left or the right of the drawing as shown in FIG. 2.

Supporting the spring means in this manner enables the latch to be resiliently biased to its rest position as shown in the Figures. If the user inserts a finger into the recess 10 and pushes the latch up in the direction of the arrow as shown in both FIGS. 1 and 2, then it will be apparent that the arm member 2 also travels slightly in this direction. When the user releases the finger from the recess 10 then the entire latch moves back down in the opposite direction to the arrow into the rest position.

With reference now to FIG. 4 it can be seen that a battery 14 has an electrically operable end 16 (which has no relevance to the present invention) and a user engageable end 18 which includes an annular recess 20. The battery 14 also includes a collar having a sloped periphery 22. In use of the device (referring now also to FIGS. 5 and 6) the user inserts the battery with its end 16 first into a hole 24 formed in the device 28. As the battery is pushed fully into the hole 24 the arms 2 will co-operate with collar 22, but because of the shape of this collar 22 the arms will ramp thereover and then drop into the annular recess 20 due to the force provided thereon by the spring means 4. Should the user attempt to pull the battery via its end 18 back out of the hole 24 then the arms 2 prevent this because of the linear surface at the interface between the annular recess 20 and the collar 22.

Removal of the battery may only be affected by operation of the latch as described hereabove which moves the arms out of the recess 20 and away from the collar 22 so that the battery may be removed.

It will be apparent that it is advantageous for the distal end of the arms 2 to be shaped to correspond with the external peripheral shape of the battery 14. In this example this means that because the battery has an annular collar 20 which is circular in cross section then the ends of the arms 2 are part circular or arcuate (26).

As has been described hereabove the device 28 with which the present invention co-operates may be any form of battery operated tool or implement.

I claim:

1. A retention latch adapted to be positioned within a device for retaining a battery or the like in the device, the retention latch comprising:
   at least one arm member arranged for releasable engagement with a battery;
   spring means arranged for resiliently biasing the at least one arm member into engagement with a said battery, said at least one arm member formed with said spring means and said at least one arm member and spring means positioned such that said at least one arm and spring means are on the same side of the battery;

and a manually operable detent means arranged for movement in a first direction against the force of the spring means "and away from the battery" thereby to release said battery from the at least one arm member, and for movement in a second direction under the force of the spring means into a rest position wherein said battery may be engaged by the at least one arm member.

2. A retention latch according to claim 1 wherein the at least one arm member has a distal end shaped to engage the peripheral shape of said battery.

3. A retention latch according to claim 1 having a pair of arm members.

4. A retention latch according to claim 1 wherein the spring member comprises a leaf spring.

5. A retention latch according to claim 4 wherein the leaf spring comprises two extensions, one on either side of the at least one arm member.

6. A retention latch according to claim 1 wherein the manually operable detent means carries a recess with which is accessed by a user.

* * * * *